United States Patent [19]

Green, III et al.

[11] Patent Number: 4,791,572

[45] Date of Patent: Dec. 13, 1988

[54] METHOD FOR ACCURATELY DISPLAYING POSITIONAL INFORMATION ON A MAP

[75] Inventors: Lawrence R. Green, III, Carmel, Ind.; John A. Carrott, Pompano Beach, Fla.; Donald R. Gray, Carmel, Ind.; Robert L. Gendler, Lighthouse Point, Fla.

[73] Assignee: Mets, Inc., Pompano Beach, Fla.

[21] Appl. No.: 801,612

[22] Filed: Nov. 20, 1985

[51] Int. Cl.$^4$ .......................... G01S 3/02; G06F 15/50
[52] U.S. Cl. ..................................... 364/449; 364/452; 364/571.04; 364/571.05; 342/450; 342/457; 340/990; 340/993; 340/995
[58] Field of Search ............... 364/424, 443, 444, 449, 364/452, 471; 340/988–991, 993, 995; 342/450–452, 457

[56] References Cited

U.S. PATENT DOCUMENTS

| | | | |
|---|---|---|---|
| 3,518,674 | 6/1970 | Morehead et al. | 342/457 |
| 3,714,650 | 1/1973 | Fuller et al. | 342/457 |
| 4,053,893 | 10/1977 | Boyer | 342/452 |
| 4,083,003 | 4/1978 | Haemmig | 340/991 |
| 4,107,689 | 8/1978 | Jellinek | 340/991 |
| 4,428,057 | 1/1984 | Setliff et al. | 342/451 |
| 4,590,569 | 5/1986 | Rogoff et al. | 364/449 |

Primary Examiner—Gary Chin
Attorney, Agent, or Firm—Wasson & Fallow Hoffman

[57] ABSTRACT

A method for accurately displaying positional information of a map. A street or terrain map is produced and then digitized. The actual location of various antenna monuments is determined and a coordinate grid map is produced. A table of positional data is created using information derived from calculating the position of each of the antenna monuments utilizing a navigational tracking system, such as the LORAN-C system. Positional information received from various vehicles and the antenna monuments is used to calculate correctional factors used to distort and skew the grid lines constructed from said table of positional data in such a manner that the exact position of a vehicle can be displayed on the street or terrain map.

12 Claims, 5 Drawing Sheets

METHOD FOR ACCURATELY DISPLAYING POSITIONAL INFORMATION ON A MAP

BACKGROUND OF THE INVENTION

Throughout history, surveyors and mapmakers utilized immovable objects or monuments as reference points for the generated survey or map. Although these monuments were generally thought to be immobile, it has recently been determined that, due to the shifting of the earth's crust and similar movements, the actual latitude/longitude coordinates of these monuments have changed. The utilization of satellite positioning systems has indicated that several of these long-standing monuments have moved, in some cases several miles, since the initial determination of their latitude/longitude coordinates. Therefore, errors could result in constructing a survey or a map without periodically updating the exact latitude/longitude coordinates of the monuments.

Additionally, it has been determined that the present method of creating a map results in a map which is accurate to 50 feet in the center of the map and to 200 feet on the outside edges of the map. The reasons for these inaccuracies are not only due to the employment of inaccurately designated monuments, but rather to the methods utilized to create the modern-day map. Typically, maps have been created by aerial photography techniques, whereby an airplane would canvas, and take a plurality of photographs of, a certain geographic area. The largest inaccuracy resulting from this technique was that the angle of the camera and the lens utilized referenced to the surface of the earth would create distortions. This was true regardless of whether an actual or an infrared picture of the area was taken. Additional inaccuracies resulted since a flat map was created from a curved surface, thereby causing an inherent distortion of the map.

This aerial photography technique has largely been replaced by orbiting or geostationary satellites. The orbiting satellites would take a single sweep across an area, record an image and then take additional scans over adjacent areas, and images are produced in a manner such as that displayed on a television screen. However, regardless of the fact that a digitized image was being produced, a flat map was still being produced from a curved surface. Additionally, since the orbiting satellite was moving at a relatively great speed, further inaccuracies resulted. While a geostationary satellite would not produce inaccuracies due to the movement of the satellite relative to the earth, distortions due to the curvature of the earth were still produced.

Generally, if the mapmaker's purpose was to create a road or terrain map where the relative positions of roads, towns or physical formations were important, the distortion inaccuracies inherent in the mapmaking procedure were relatively unimportant, as long as the relative positions were consistent. However, quite recently, the need for tracking a particular vehicle and displaying the position of the vehicle on a digitized map more accurately than the distortion factor produced by state-of-the-art maps has been recognized. The Assignee of the present invention has developed a system, described in U.S. Pat. No. 4,651,157 for tracking a vehicle, and this application is incorporated by reference. One of the purposes of the invention described in the aforementioned application was to quite accurately track the position of a vehicle, such as a police car, taxi, ship or similar vehicle or vessel, as it traverses city streets or marine channels and rivers. The application describes a system in which a computer-generated digital map is provided on a display screen, and the position of the tracked vehicle is projected onto this map. Quite obviously, if the particular map is accurate to only 50 feet, the position of the tracked vehicle would not be accurately displayed on the projected map. Instead of the position of the automotive vehicle being properly shown on a particular street or road, the map might indicate that this vehicle is in the middle of a field or within a permanent structure, such as a building.

Therefore, a method of accurately displaying the position of the vehicle on a map, regardless of the inherent inaccuracy of the produced digitized map, must be developed. This display technique would then be able to be utilized in conjunction with the tracking system described in U.S. Pat. No. 4,651,157.

SUMMARY OF THE INVENTION

The aforementioned disadvantages of the prior art are overcome by the use of the present invention which describes a method of displaying the position of various vehicles or vessels on a generated map much more accurately than any known method of display, regardless of any distortion or error produced by the map itself.

Initially, a digitized street or terrain map is produced utilizing state-of-the-art techniques and inputted into a computer provided with a display screen. Before the digitized map is displayed, the exact coordinates of a plurality of reference monuments are determined utilizing various known techniques, such as laser surveying. The exact coordinate system employed in the present invention is unimportant as long as a consistent system is used. For the sake of simplicity, the invention will be further described with respect to a latitude/longitude coordinate system, although it is noted that the state plane coordinate system, or any other coordinate system, could be utilized. Thereafter, the exact latitude/longitude coordinates of the reference monuments are inputted into the computer's memory in the form of a table of geographical reference coordinate data referenced to the digitized map, thereby allowing the exact position of the reference monuments to be displayed on the digitized map. Although this table of data is not generally used to produce a map to be displayed on the computer screen, if this information were to be used to produce a map, this map would be composed of a first series of parallel lines and a second series of parallel lines perpendicular to the first series of parallel lines. After this information has been provided to the computer, the position of each of these reference monuments is determined by navigational tracking techniques such as the land or sea-based LORAN-C Navigational System. Additionally, it should be noted that any navigational system from which positional information can be derived could be used with the method of the present invention. These systems could be used with air-borne transmitters carried aloft by balloons or ultimately, satellites may be employed for this purpose. The latitude/longitude coordinates determined by the navigational system utilized are compared to the exact latitude/longitude coordinates previously discovered. Since it is quite unlikely that these two sets of coordinates for each of the monuments would be equal, a correction factor is derived based upon these sets of coordinates.

This correction factor is inputted into the system computer.

Utilizing the LORAN-C information received for all of the monuments, a table of positional data is produced bridging the digitized map with the latitude/longitude map. This table is inputted into the system computer. Although this table of data is not generally used to produce a map to be displayed on the computer screen, if this information were to be used to produce a map, the map would be composed of a plurality of parallel curved lines formed in a grid-like pattern. The correction factor previously determined is used to update the table of positional data previously compiled and would then effectively distort or skew the aforementioned plurality of parallel curved lines which would be produced if the positional data would be used to produce a displayed map in such a manner that each of the monuments would be precisely displayed at its actual location on the displayed digitized street or terrain map. At this point, the method of the present invention would display the position of a tracked vehicle more accurately than has been presently accomplished.

However, the position of the tracked vehicle can be displayed still more accurately by dispatching various vehicles which are in communication with the central station are dispatched and traverse the geographical area to be mapped and displayed. As previously implied, both vehicles or vessels can be utilized and tracked, but for simplicity, the term vehicle will be construed to include vessels or even aircraft. These vehicles are in voice communication with the monuments or a central station, verbally indicating the exact physical position of the vehicle to the central station as well as transmitting navigational tracking information received by LORAN-C transmitters to the central station.

This newly received information is used to produce a second correction factor by comparing the exact physical location of each of the vehicles with the position of the vehicle determined by the standard LORAN-C navigational techniques known in the art. This second correction factor is used to again update the table of positional data and this data is used to produce a transparent layer map, and then the curved grid lines produced by such a map would be distorted and skewed, but the position of the vehicles would be correlated with the latitude/longitude coordinate system to accurately display the position of the vehicle on the street or terrain map.

In operation, any vehicle being tracked by the system of the present invention would be accurately displayed on the street or terrain map by positioning the vehicle on the distorted and skewed transparent layer map and then projecting this position onto the street or terrain map. Since the LORAN-C signals received from the LORAN-C transmitters by the monuments are constantly being distorted, the exact position of each monument is constantly compared to the position of each monument determined by the LORAN-C triangulation techniques and additional correction factors are continually being derived. These factors are used to distort or skew the grid lines of the transparent layer map even further, and it can be shown that this map is virtually in a constant state of flux. Alternatively, this additional information could be used to slightly distort or "rubber sheet" the digitized street or terrain map without altering the transparent map.

BRIEF DESCRIPTION OF THE DRAWINGS

The novel features of the present invention, as well as the invention itself, will be better understood from the following description, taken in conjunction with the accompanying drawings wherein.

DESCRIPTION OF THE PREFERRED EMBODIMENT

Figure 1:
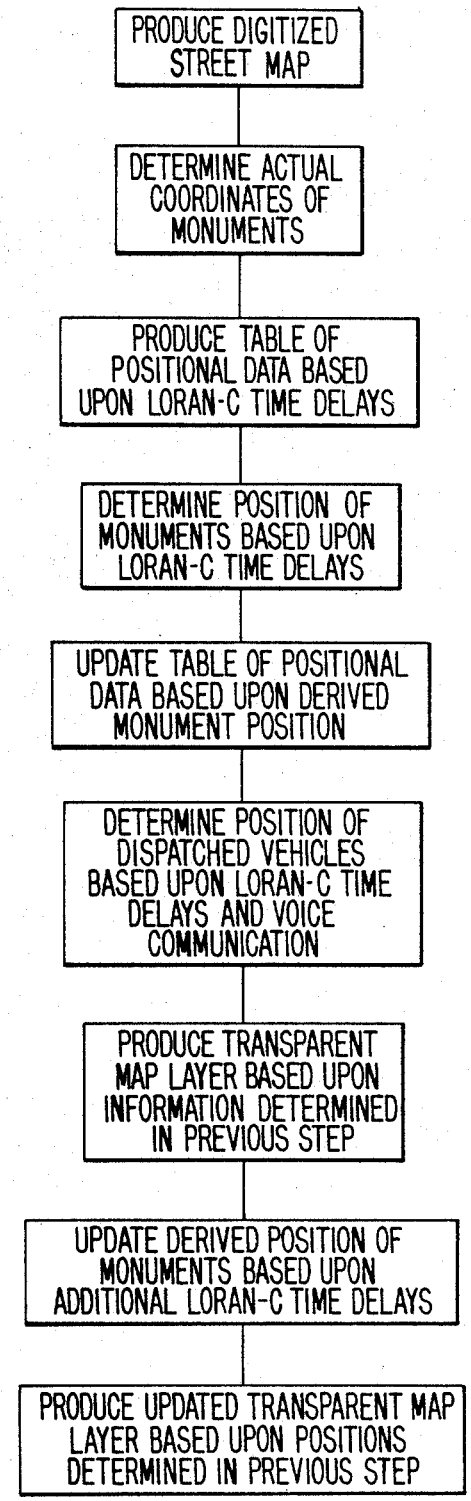
FIG. 1 is a block diagram outlining the various steps utilized to display a vehicle on a map, according to a first embodiment of the present invention.

The present invention utilizes a LORAN-C transmitting network to provide the raw data used with a known triangulation computation technique for positively indicating the position of various reference monuments as well as the position of the vehicles which are to be tracked and displayed on a display screen. Generally speaking, a typical LORAN-C system includes a master transmitting station and at least two, but preferably four "slave" transmitters. The master station transmits a coded series of pulses used to synchronize the operation of the "slave" transmitters. After a predetermined coding delay, each "slave" transmitter will transmit a group of coded pulses. A LORAN-C receiver placed upon the vehicle and the reference monuments would receive both the signals transmitted by the master as well as all of the signals transmitted by the "slave" transmitters. Since the exact latitude/longitude coordinates of each of these stations is known, the time delays (TD's) between the transmissions by the "slave" transmitters and the receipt of these signals by the vehicle are used, through the standard triangulation technique, to determine the exact latitude/longitude coordinates of the vehicle or the monuments. In this context, it should be noted that the exact coordinates of the vehicle are not determined utilizing software provided within a computer onboard the vehicle, but all the computations using the received TD's are accomplished at a central station.

The present invention contemplates a system in which each of the reference monuments is an antenna, or is attached to an antenna, and these monuments will now be referred to as antenna monuments. However, it should be noted that the present invention would operate with equal facility if the reference monuments were not antennas.

Since the LORAN-C transmitters transmit a ground wave of relatively low frequency (between 90 and 110 KHz), the accuracy of the system is compromised because the signal is affected by the terrain over which it travels. Therefore, unless the information received by the antenna monuments is corrected, the exact location of the vehicle, as calculated utilizing the aforementioned triangulation techniques, would be inaccurate. Upon installation, the exact latitude and longitude coordinates of each of the antenna monuments are determined by standard techniques, such as laser surveying. The latitude/longitude coordinates for each antenna monument will be referenced as to the actual coordinates. Each antenna is provided with a LORAN-C receiver and receives the same navigational pulses generated by the LORAN-C transmitters received by the vehicles. The navigational pulses received by these fixed antenna monuments are used to determine the latitude/longitude coordinates of the specific antenna monument. These coordinates will be referred to as the derived coordinates. The derived coordinates of the antenna monuments are compared with the actual coordinates for each of the antenna monuments, and a correction factor is then derived at the central station which is used in conjunction with the TD's transmitted from each vehicle to the central station for automatically determining the exact position of each tracked vehicle with great accuracy. According to the present invention as illustrated with respect to FIGS. 1 and 2, a street or terrain map of a particular geographical area is produced and either subsequently digitized or is digitized during the production of the map. This information is then inputted into the memory of a computer 12 provided at a central station through techniques well known in the art in such a manner that the map could be visually displayed upon the display screen 14 of the computer. A plurality of locations provided in the geographical area will then be designated as monument reference points. Antennas 16, 18 and 20 will be designated as these monument reference points. Although three antennas are shown in FIG. 2, it can be appreciated that many antennas can be utilized and that the accuracy of the displayed map will increase as a greater number of antennas is used. These antennas are constructed to receive the TD's 22, 24, 26 generated by the LORAN-C transmitters, as well as transmitting information to the central station antenna 10. This information can be transmitted using RF waves or electrical wires. The actual latitude/longitude reference points for each of the antenna monuments are determined through known techniques, such as laser surveying.

Once the actual latitude/longitude reference points for each of the antenna monuments are determined, a table of geographical reference coordinates is compiled and inputted into the computer's memory and is referenced to the data used to compile the digitized street or terrain map.

Figure 3:
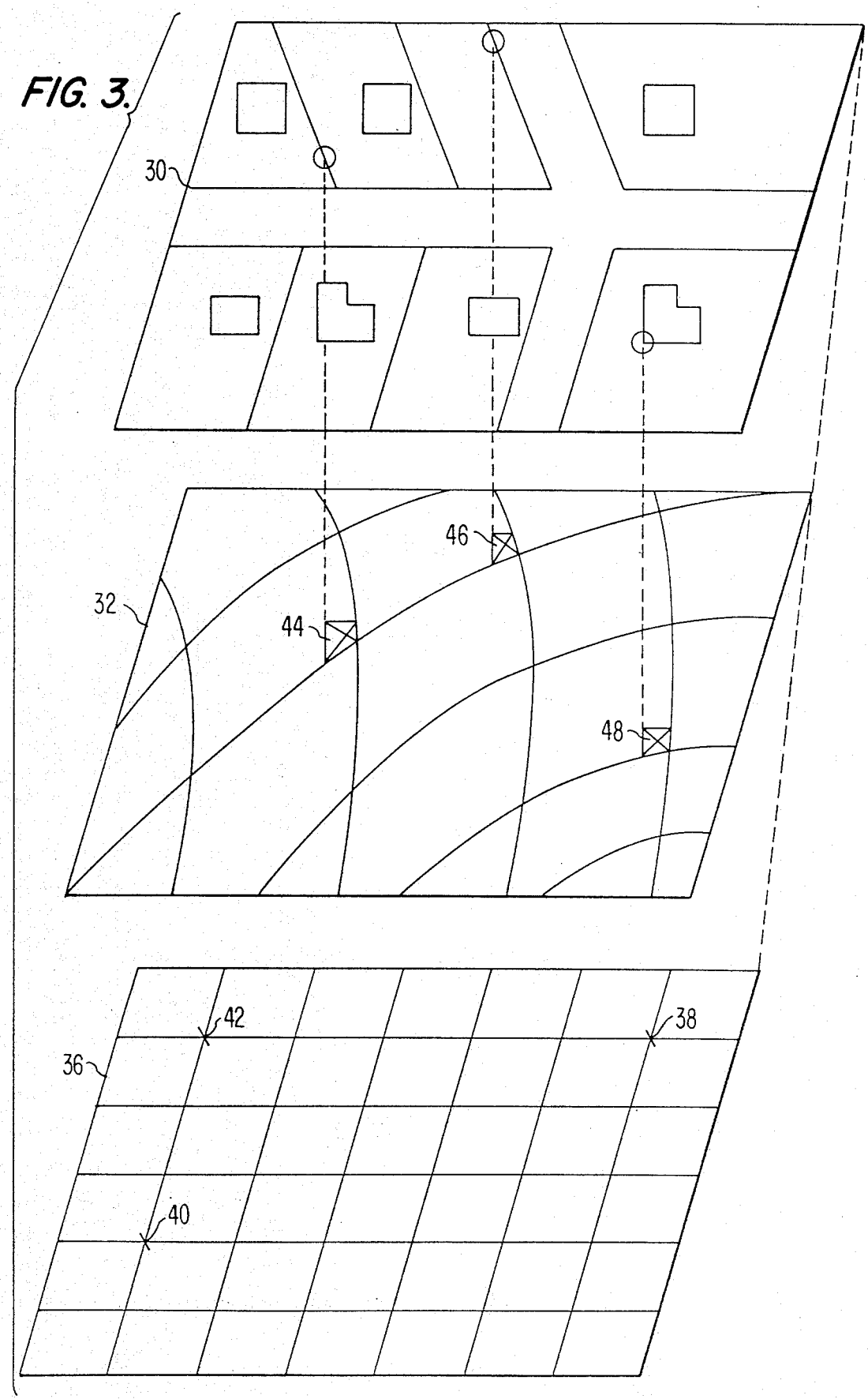
FIG. 3 is a diagram showing the position of vehicles displayed on a map without utilizing the method of the present invention.
Figure 4:
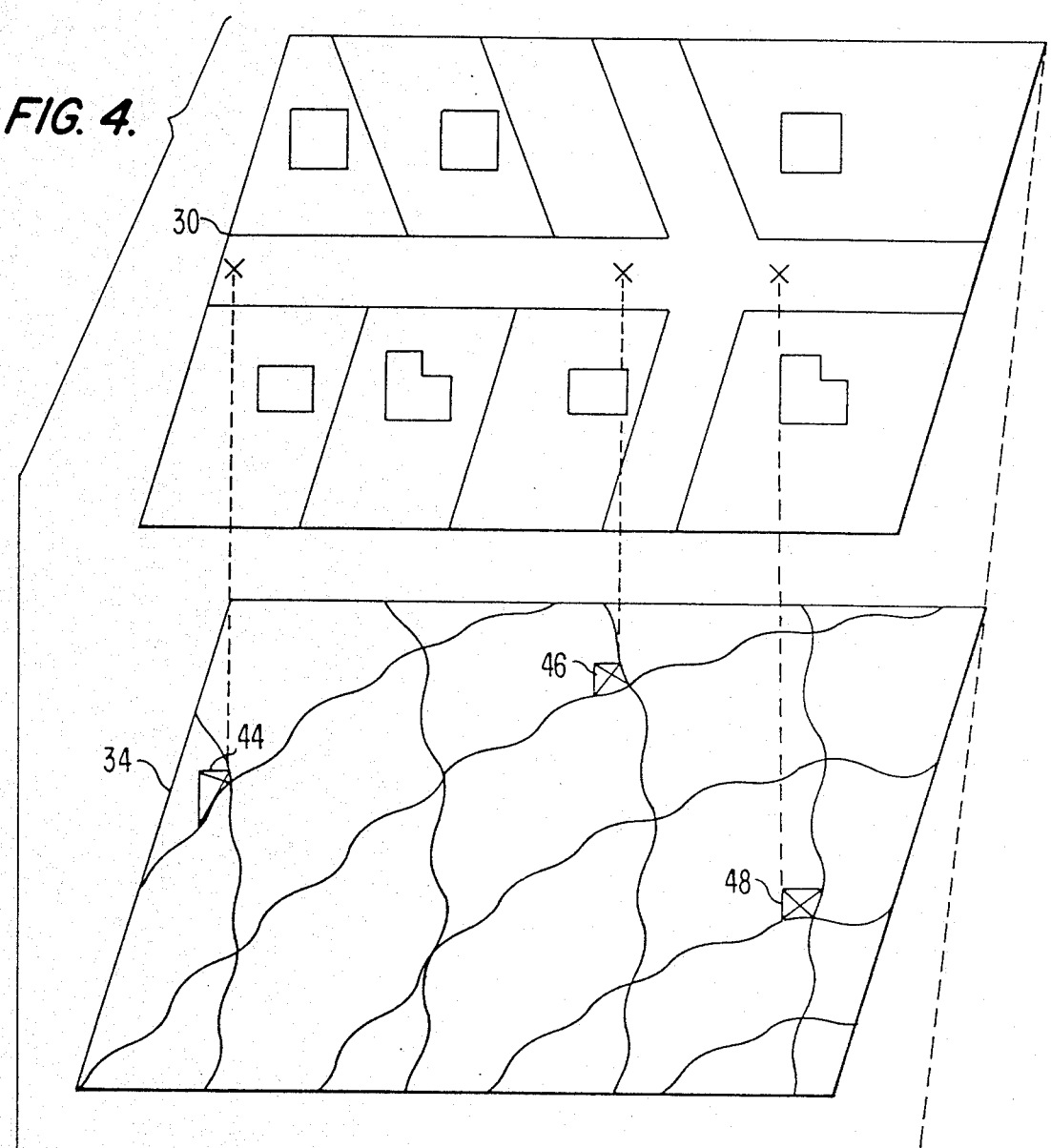
FIG. 4 is a diagram showing the position of vehicles on a map produced by the method of the first embodiment of the present invention.

Although this latitude/longitude data is not generally used to produce a map to be displayed on the computer screen, if this information were to be used to produce a map, this map would be composed of a first series of parallel lines and a second series of parallel lines as shown in FIGS. 3 and 4. This geographical reference map could be used to accurately display the exact position of each antenna monument on the street or terrain map. Since the digitized street or terrain map is itself inaccurate, this map and the latitude/longitude map can be correlated to display each antenna monument at its physically correct location on the digitized map. The computer inputting steps as well as the correlation technique are known in the art and will not be explained further.

The LORAN-C TD's received by each of the antenna monuments 16, 18, 20 and transmitted to the central station are used to produce a table of positional data which acts as a correlation bridge between the digitized map and the latitude/longitude reference map. As initially produced and shown in FIG. 3, this table of positional data, while not usually utilized as a visual map, if plotted and displayed on the display screen would produce a map 32 containing a grid-like pattern of equally spaced, smooth, curved TD lines. However, since this initial table of positional data was developed through the use of the inherently inaccurate LORAN-C received transmissions, the position of the antenna monument itself or the tracked vehicle which would appear in this table of positional data, would not be properly positioned when displayed on the street or terrain map. Therefore, the central station compares the positional signals received from each of the antenna monuments with the actual position of each of the antenna monuments and applies a correction factor to the received positional information to produce a derived position for each of the antenna monuments. These derived position coordinates in conjunction with the correction factor are used to skew or distort the curved grid lines which could be constructed using the table of positional data and would be useful in displaying the derived coordinates of the antenna monuments or any tracked vehicle more accurately onto the displayed street or terrain map. This updating of the table of positional data would result in non-smooth and non-parallel grid lines.

Please note that the present invention would operate with equal facility if the central station calculated the derived coordinates for each of the antenna monuments and then produced the initial table of positional data prior to determining the first correction factor.

The map which has now been produced after correcting the table of positional data based upon the derived antenna monument positions, would more accurately display a tracked vehicle thereon than any known mapping and displaying technique. However, unless a second correction technique is employed, this particular mapping and displaying system could still not be adequately utilized to track a vehicle in a city street or a vessel in inland waterways. This is true since the vehicle and vessel would be transmitting their received TD's to the central station and these TD's would be inaccurate due to distortions in the immediate area of the vehicle. These distortions are caused by magnetic fields, electrical wires, tall buildings and the difference of the propagation rate of the LORAN-C signals over water versus over land. Therefore, the present invention overcomes this distortion problem by dispatching a plurality of vehicles to traverse the geographical area encompassed by the map. These vehicles would transmit the TD's received from the LORAN-C transmitters to the central station at various locations in the geographical area or sector. Simultaneously, each vehicle would be in voice communication with the central station and would positively indicate its physical location (such as a particular intersection or other physical monument). The central computer 12 would then coordinate the derived position of each of the vehicles as calculated utilizing the standard triangulation technique with the actual position of the vehicles as verbally reported to the central station. The computer 12 would then utilize this information and further update the table of positional data and create a transparent map layer having considerably skewed and distorted grid lines which could now be employed to positively coordinate the position of each vehicle with respect to the street or terrain map. Once this second correction step is completed, any vehicle which is tracked by the system would be accurately and precisely displayed on the street map displayed by the computer.

Additionally, it should be noted that the relative location of each of the antenna monuments would constantly be altered due to various atmospheric conditions. Therefore, the position of each of these monuments with respect to the transparent layer map must be constantly updated, and the TD lines provided on this map are constantly being changed on the order of from every two to three seconds to every several minutes. Once the derived location of each of the antenna monuments is redetermined, this location is used to further skew or distort the TD lines provided on the transparent layer map. Since the local distortion factors are relatively constant, it would not be necessary to continually dispatch vehicles to provide the information needed to produce the second correction factor. Rather, these vehicles would be dispatched on the order of every six months to a year or if it has independently been determined that these local distortion factors have dramatically been altered.

FIGS. 3 and 4 show graphical representations of the street or terrain map 30 displayed on the display screen 14 as well as the representation of the table of positional data 32, the transparent layer map 34 and the representation of the table of geographical reference coordinates 36. FIG. 3 illustrates a display if the method of the present invention is not employed and FIG. 4 shows a display utilizing the method of the present invention. As previously indicated, a digitized map 30 of an area is produced and inputted into the computer at a central station. Additionally, the actual latitude/longitude position of a number of antenna monuments 38, 40 and 42 are determined and a table of geographical reference coordinates are developed as represented by the grid 36 which shows the actual position of each of the antenna monuments thereon. Please note that this latitude/longitude map 36 is graphical, as shown in FIGS. 3 and 4, but is not actually displayed on the display screen 14. As shown in FIGS. 3 and 4, the digitized map 30 and the graphical representation of the latitude/longitude map 36 do not change.

After information relating to the digitized map 30 and the latitude/longitude map 36 are introduced to the computer, a graphical representation 32 of the table of positional data can be produced using the time delay information relayed to the central station from the antenna monuments 38, 40 and 42. As shown in FIG. 3, this graphical representation 32 consists of a number of equally spaced, smooth, curved lines. However, please note that this map 36 is merely a graphical representation and is not meant to be displayed on the display screen. Therefore, if the method of the present invention is not utilized, the position of vehicles 44, 46 and 48 as determined by the standard triangulation techniques based upon information transmitted to the central station by the vehicles and the LORAN-C transmissions received by the central station is shown on graphical representation 32 and if the positions of these vehicles are projected onto the street or terrain map 30, as shown by the dashed lines, they would be inaccurately depicted, since all of the vehicles are assumed to be on a street or thoroughfare and not in the middle of property, as shown in FIG. 3.

FIG. 4 shows a graphical representation of a street and terrain and various vehicles depicted thereon after the various correction factors have been accomplished according to the method of the present invention. As previously described, the street and terrain map 30 as well as the table of geographical reference coordinates as represented by the map 36 are not changed. However, after the various correction factors are accomplished, the grid lines of the transparent layer map 34 are markedly different than the grid lines of the graphical representation 32. Therefore, when the positional information generated by vehicles 44, 46 and 48 is now received by the central station and depicted on the transparent layer map 34, as shown in FIG. 4, the position of these vehicles will now be correctly shown on the street and terrain map 30.

Figure 5:
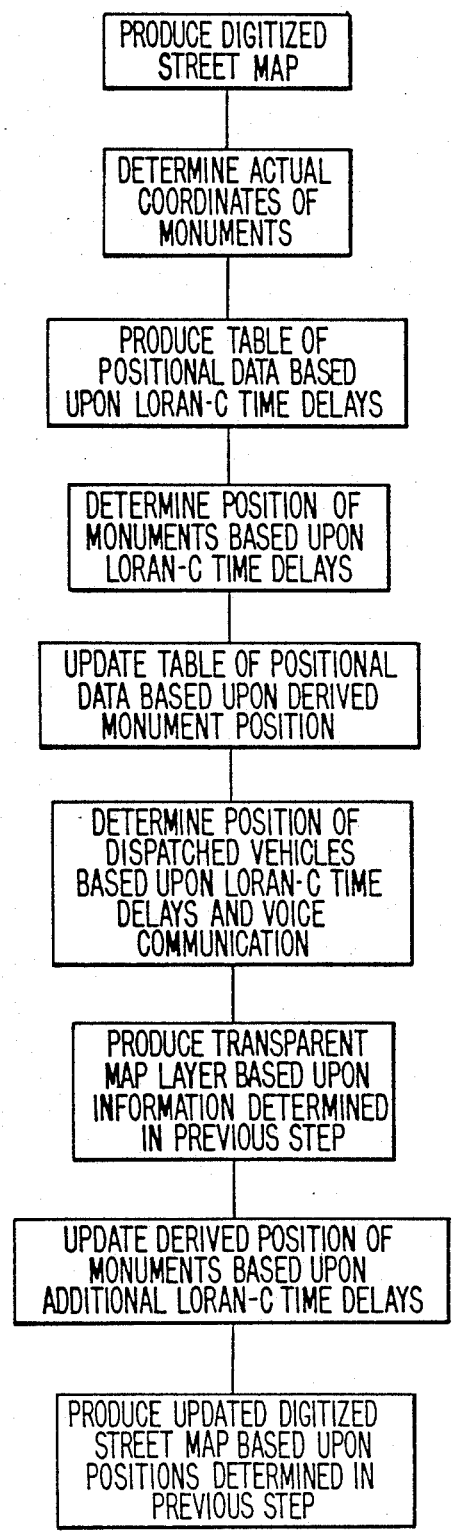
FIG. 5 is a block diagram outlining the various steps utilized to display a vehicle on a map, according to a second embodiment of the present invention.

A second embodiment of the present invention is shown in FIG. 5. The first embodiment of the invention as discussed hereinabove recites a method of producing an accurate positional display of a particular vehicle or vehicles by producing a table of positional data and manipulating and updating this data to produce a transparent map layer used to accurately display positional data on a digitized map without altering the data used to construct the digitized map after the data as inputted into the computer. This second embodiment produces an accurate display by slightly distorting or skewing the digitized street and terrain map.

Figure 2:
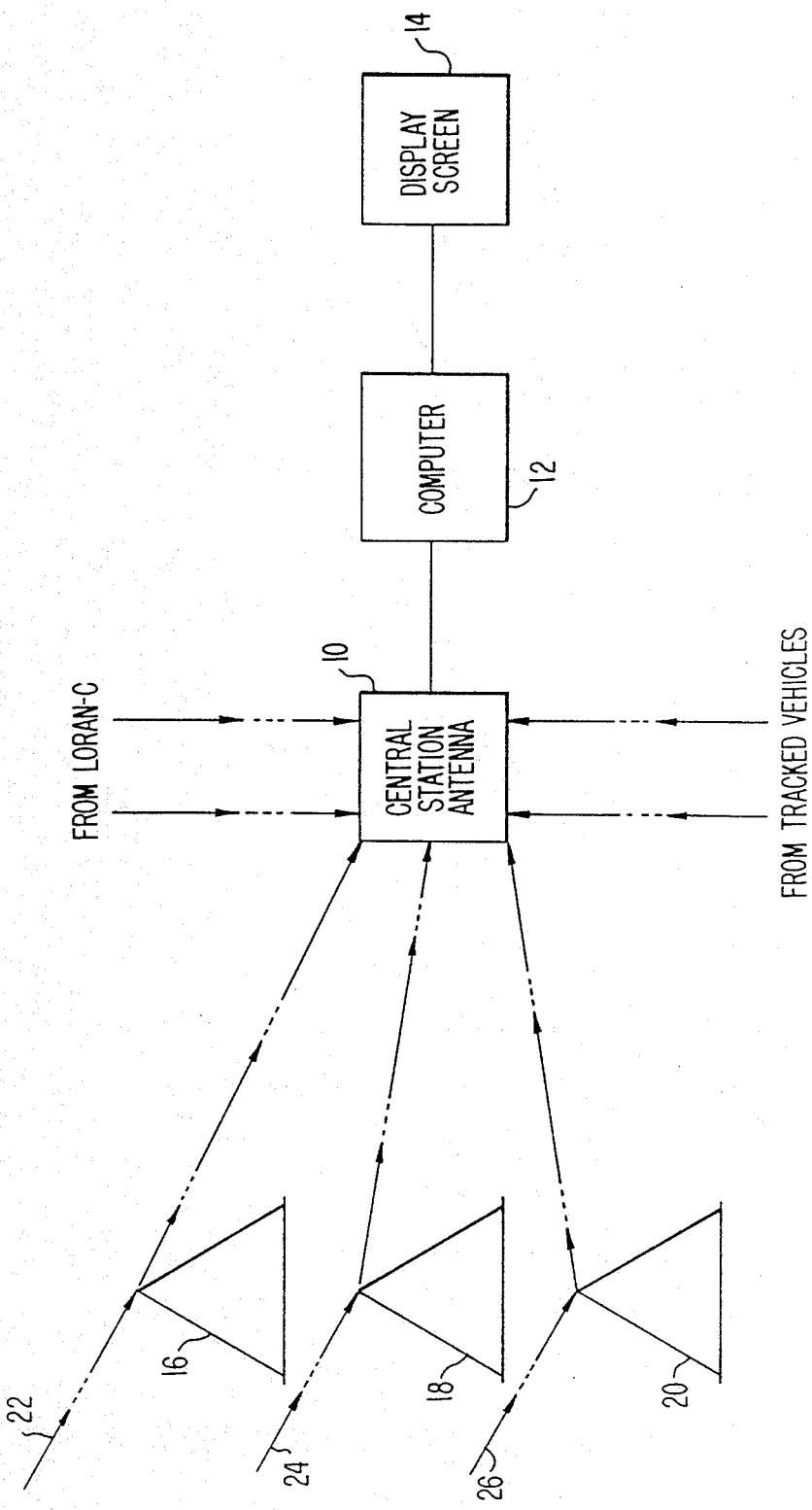
FIG. 2 is a block diagram showing the various components of the present system.

As illustrated in FIGS. 1 and 5, the methods of both embodiments are exactly the same until the updated derived position of each antenna monument based upon the receipt of additional LORAN-C time delays is determined. Under most atmospheric conditions, the updated derived positional information of each antenna monument would virtually equal the original derived antenna monument position and the corrected transparent layer would almost be identical to the original transparent layer. In this situation, it is possible to provide an accurate display by correcting this slight change of the derived antenna monument position by manipulating the data used to generate the digitized street and terrain map and not the data used to generate the transparent map layer. Therefore, the projected digitized street or terrain produced by the method of the second embodiment would be slightly skewed or distorted with respect to the original digitized map.

A threshold level is provided in the computer and if the correction factor relating to the updated derived position of the antenna monuments is greater than this level, thereby indicating a large change in the derived position, the transparent map layer will be updated. However, if this threshold level is not exceeded, the digitized map will be altered. Additionally, dependent upon the particular correction factor determined, both the transparent map layer as well as the digitized map would change.

Numerous characteristics and advantages of the invention have been set forth in the foregoing description, together with details of the method and function of the present invention. The disclosure, however, is illustrative only, and changes may be made in various details within the principle of the invention, to the full extent indicated by the broad general meaning of the terms in which the appended claims are expressed.

What is claimed is:

1. A method for displaying positional data on a map of a geographical area including the steps of:
   producing a digitized street or terrain map consisting of digitized data and inputting said digitized data into a computer provided with a display screen, said computer provided at a central station;
   determining the actual geographical coordinates of a plurality of reference monuments;

producing a table of geographical reference coordinates based upon the geographical coordinates of said reference monuments and inputting this map into said computer, said table of geographical reference coordinates referenced to said digitized street or terrain map;

producing a table of positional data based upon first actual time delay signals generated by a navigational tracking system and received by said plurality of reference monuments, said first actual time delay signals received by said reference monuments being transmitted to said central station computer at said central station, said central station computer producing a derived set of coordinates of each of said reference monuments based upon said first actual time delay signals;

comparing the actual geographical coordinates of said reference monuments with the derived set of coordinates and determining a first correction factor based upon the difference of said actual and said derived set of coordinates;

updating said table of positional data utilizing said first correction factor derived in said comparing step;

determining a relative position of a plurality of vehicles in said geographical area by comparing the derived position coordinates of each of said vehicles generated by the receipt of second actual time delay signals from the navigational tracking system by each of said vehicles and the transmission of said second actual time delay signals from each of said vehicles to said central station computer with the actual position coordinates of each of said vehicles, and determining a second correction factor based upon the difference of said actual and said derived set of coordinates;

producing a transparent map layer utilizing said second correction factor derived in said immediately preceding step;

receiving, at said central station, vehicular positional information generated by the navigational tracking system for at least one vehicle to be tracked; and displaying said vehicular positional information on said digitized street or terrain map.

2. The method for displaying positional data on a map of a geographical area in accordance with claim 1, further including the step of continually updating said derived set of reference monument coordinates based upon newly received data generated by the navigational tracking system and producing updated transparent map layers.

3. A method for displaying positional data on a map of a geographical area including the steps of:

producing a digitized street or terrain map consisting of digitized data and inputting said digitized data into a computer provided with a display screen, said computer provided at a central station;

determining the actual geographical coordinates of a plurality of reference monuments;

producing a table of geographical reference coordinates based upon the geographical coordinates of said reference monuments and inputting this map into said computer, said table of geographical reference coordinates referenced to said digitized street or terrain map;

producing a table of positional data based upon first actual time delay signals generated by a navigational tracking system and received by said plurality of reference monuments, said first actual time delay signals received by said reference monuments being transmitted to said central station computer at said central station, said central station computer producing a derived set of coordinates of each of said reference monuments based upon said first actual time delay signals;

comparing the actual geographical coordinates of said reference monuments with the derived set of coordinates and determining a first correction factor based upon the difference of said actual and said derived set of coordinates;

updating said table of positional data utilizing said first correction factor derived in said comparing step;

determining a relative position of a plurality of vehicles in said geographical area by comparing the derived position coordinates of each of said vehicles generated by the receipt of second actual time delay signals from the navigational tracking system by each of said vehicles and the transmission of said second actual time delay signals from each of said vehicles to said central station computer with the actual position coordinates of each of said vehicles, and determining a second correction factor based upon the difference of said actual and said derived set of coordinates;

producing a transparent map layer utilizing said second correction factor derived in said immediately preceding step;

receiving, at said central station, vehicular positional information generated by the navigational tracking system for at least one vehicle to be tracked;

displaying said vehicular positional information on said digitized street or terrain map; and continually updating said derived set of reference monument coordinates based upon newly received data generated by the navigational tracking system and producing updated transparent map layers.

4. The method in accordance with claim 1 wherein a LORAN-C navigational tracking system is utilized.

5. The method in accordance with claim 3 wherein a LORAN-C navigational tracking system is utilized.

6. The method in accordance with claim 1 wherein said plurality of vehicles is in verbal communication with said central station during said second determining step.

7. The method in accordance with claim 3 wherein said plurality of vehicles is in verbal communication with said central station during said second determining step.

8. A method for displaying positional data on a map of a geographical rea inlcuding the steps of:

producing a digitized street or terrain map consisting of digitized data and inputting said digitzied data into a computer provided with a display screen, said computer provided at a central station;

determining the actual geographical coordinates of a plurality of reference monuments;

producing a table of geographical reference coordinates based upon the geographical coordinates of said reference monuments and inputting this map into said computer, said table of geographical reference coordinates referenced to said digitized street or terrain map;

producing a table of positional data based upon first actual time delay signals generated by a navigational tracking system and received by said plurality of reference monuments, said first actual time delay signals received by said reference monuments being transmitted to said central station computer at said central station, said central station computer producing a derived set of coordinates of each of said reference monuments based upon said first actual time delay signals;

comparing the actual geographical coordinates of said reference monuments with the derived set of coordinates and determining a first correction factor based upon the difference of said actual and said derived set of coordinates;

updating said table of positional data utilizing said first correction factor derived in said comparing step;

determining a relative position of a plurality of vehicles in said geographical area by comparing the derived position coordinates of each of said vehicles generated by the receipt of second actual time delay signals from the navigational tracking system by each of said vehicles and the transmission of said second actual time delay signals from each of said vehicles to said central station computer with the actual position coordinates of each of said vehicles, and determining a second correction factor based upon the difference of said actual and said derived set of coordinates;

producing a transparent map layer utilizing said second correction factor derived in said immediately preceding step;

receiving, at said central station, vehicular positional information generated by the navigational tracking system for at least one vehicle to be tracked;

displaying said vehicular positional information on said digitized street or terrain map;

continually updating said derived set of reference monument coordinates based upon newly received data generated by the navigational tracking system; and altering the data used to produce said digitized street or terrain map to produce updated digitized street or terrain maps.

9. The method in accordance with claim 8 wherein a LORAN-C navigational tracking system is utilized.

10. The method in accordance with claim 8 wherein said plurality of vehicles is in verbal communication with said central station during said second determining step.

11. A method for displaying positional data on a map of a geographical area including the steps of:

producing a digitized street or terrain map consisting of digitized data and inputting said digitized data into a computer provided with a display screen, said computer provided at a central station;

determining the actual geographical coordinates of a plurality of reference monuments;

producing a table of geographical reference coordinates based upon the geographical coordinates of said reference monuments and inputting this map into said computer, said table of geographical reference coordinates referenced to said digitized street or terrain map;

producing a table of positional data based upon first actual time delay signals generated by a navigational tracking system and received by said plurality of reference monuments, said first actual time delay signals received by said reference monuments being transmitted to said central station computer at said central station, said central station computer producing a derived set of coordinates of each of said reference monuments based upon said first actual time delay signals;

comparing the actual geographical coordinates of said reference monuments with the derived set of coordinates and determining a first correction factor based upon the difference of said actual and said derived set of coordinates;

updating said table of positional data utilizing said first correction factor derived in said comparing step;

receiving, at said central station, vehicular positional information generated by the navigational tracking system for at least one vehicle to be tracked; and displaying said vehicular positional information on said digitized street or terrain map.

12. The method in accordance with claim 11 wherein a LORAN-C navigational treating system is utilized.

* * * * *